Aug. 28, 1945.  E. S. MacPHERSON  2,383,872
GENERATOR DRIVE
Filed Jan. 15, 1943   2 Sheets-Sheet 1
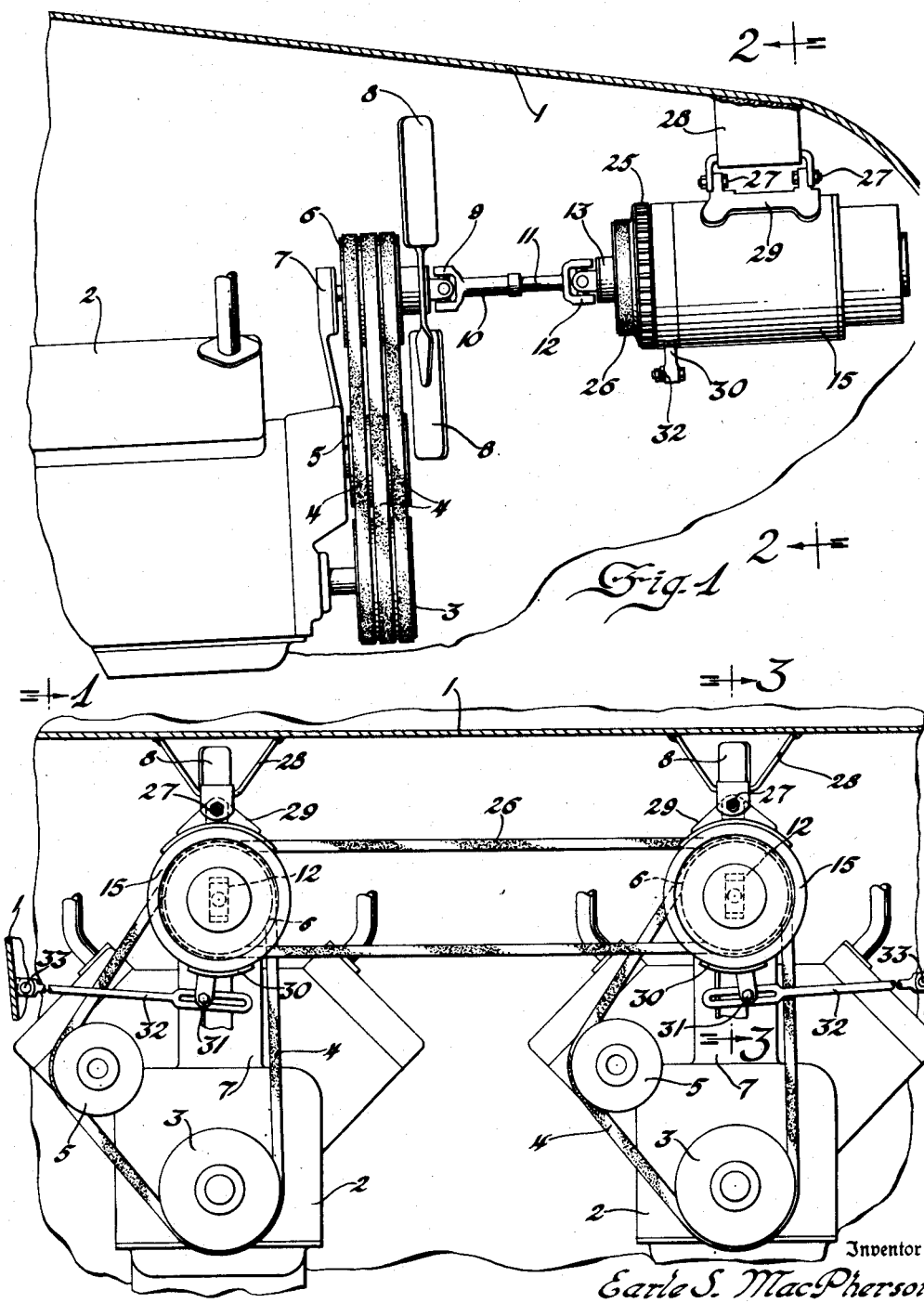

Aug. 28, 1945. E. S. MacPHERSON 2,383,872
GENERATOR DRIVE
Filed Jan. 15, 1943 2 Sheets-Sheet 2
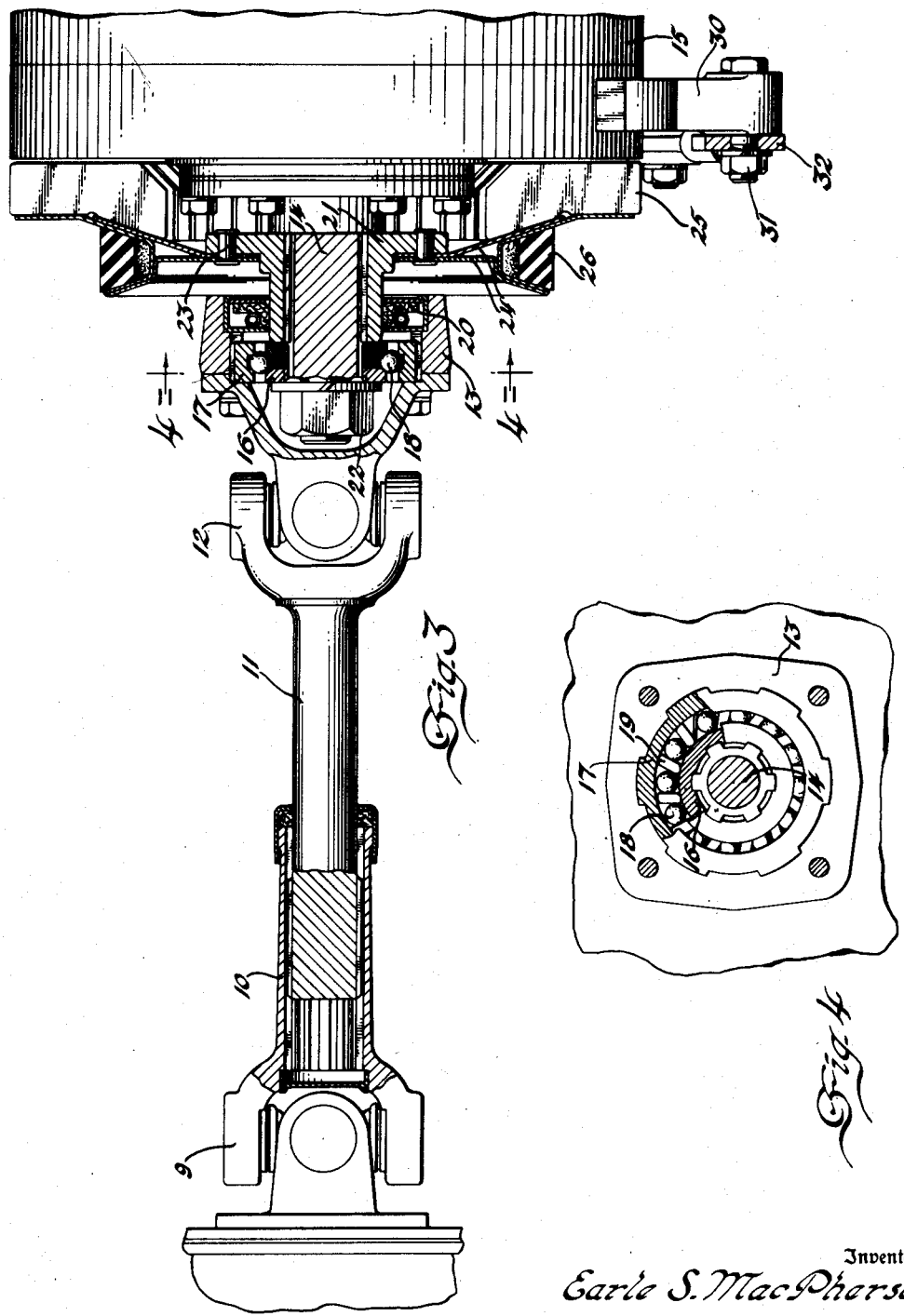
Inventor
Earle S. MacPherson
By Blackmore, Spencer & Flint
Attorneys Patented Aug. 28, 1945

2,383,872

UNITED STATES PATENT OFFICE 2,383,872

GENERATOR DRIVE

Earle S. MacPherson, Detroit, Mich., assignor to General Motors Corporation, Detroit, Mich., a corporation of Delaware Application January 15, 1943, Serial No. 472,500

4 Claims. (Cl. 171—231)

Partially in the interest of swinging into production quickly on military equipment, the current practice is to employ standard mechanical structure already available. In the case of armored cars, for example, motive power is supplied by dual automotive type engines coupled together for driving the vehicle running gear. For supplying electrical energy for the vehicle electrical system and storage battery, each engine has associated with it a conventional generator with the two generators connected in parallel in the same electrical system.

It is an object of the present invention to synchronize the operation of the generators for current output in balanced relation. Accordingly, the generators are geared together in given ratio dependent upon their relative sizes and in the case of like generators as here involved, a convenient coupling is an endless belt engaging same diameter pulleys on the generator armature shafts. For keeping the drive belt in proper tension the generators are mounted for adjustment of the pulleys toward and away from one another and because of their adjustable mountings and to accommodate misalignment, each generator armature shaft is connected with its engine operated driving shaft by universally jointed propeller shaft sections slidably splined together. Each engine driven coupling for the respective generators also includes a one-way or overrunning clutch to enable both generators to be operated at all times through the belt drive at the same speed ratio from whichever engine overruns the other. Except for friction slippage and minor variables in the gear train, the two engines when coupled together for conjoint operation should operate at the same speed and together drive both generators. However, the overrunning clutch connections insure generator operation in matched relation regardless of variations in relative driving speeds thereto and their equalized operation from one engine alone, in the event either engine is out of operation and only one engine is supplying vehicle motive power.

For a better understanding of the invention reference will be made to the accompanying drawings wherein Figure 1 is a longitudinal vertical section through the rear deck of an armored car and showing in side elevation the engine driven generator arrangement and may be considered as looking in the direction of the arrows on line 1—1 of Figure 2; Figure 2 is an end elevation looking in the direction of the arrows on line 2—2 of Figure 1; Figure 3 is an enlarged sectional view of the generator drive mechanism taken on line 3—3 of Figure 2 and Figure 4 is a detail sectional view of an overrunning clutch structure and is taken on line 4—4 of Figure 3.

In the drawings the armor plate rear deck 1 encloses a pair of rearwardly mounted and longitudinally disposed engines 2—2 which are arranged side by side. These engines are of a conventional type and include the usual variable speed transmission assemblies having their power output shafts geared together so that both engines can be employed to drive the running gear or vehicle traction mechanism. By proper manipulation of suitable clutches either engine may be disconnected from the running gear so that the vehicle can be operated by one engine alone but the particular mechanism involved forming no part of the present invention and being well known is not illustrated in the drawings.

Opposite the power output end of each engine unit the engine crankshaft has keyed thereon a multiple belt pulley 3 engaged by the belts 4 which run over a water pump pulley 5 and a fan pulley 6. The shaft of the fan pulley is mounted in a suitable bracket or standard 7 carried by the engine and supports a fan 8 whose operation induces a draft of air through the rear deck for ventilating the engine compartment and insuring flow of cooling air through the radiators forming parts of the engine cooling systems. The fan shaft is connected by a universal joint 9 to a propeller shaft including a hollow tubular section 10 and a solid shaft section 11 whose adjoining ends are telescopically fitted and splined together for a sliding drive therebetween. At its remote end the propeller shaft section 11 is secured by universal joint 12 to a drive housing 13. This housing encloses and is drive coupled to a projecting end of an armature shaft 14 of the electrical generator indicated generally at 15. The drive coupling incorporates an overrunning clutch, which as seen in Figure 4, includes an inner race 16 keyed to the armature shaft 14 and an outer race 17 keyed to the housing 13 interiorly thereof, together with a series of alternately arranged bearing balls 18 and tiltable clutch members 19 interposed between the inner and outer races. The bearing balls support the inner and outer races relatively to one another and also serve as spacers between the clutching elements or wedges 19, the whole being a well known type of one way clutch. When the operation of the parts is counterclockwise, as viewed in Figure 4, the clutching elements 19 will be tilted to lock or wedge the inner and outer races together if the speed of the rotation of the outer race is not overrun by that of the inner race. However, should the inner race overrun the outer race the clutching elements automatically uncouple the races for their free rotation.

The housing 13 is closed by a wiper seal 20 of a known type which engages the sleeve 21 mounted on the armature shaft between a shaft shoulder and the inner race of the overrunning clutch, the latter being held on the armature shaft by the fastening nut 22. Carried by the sleeve 21 is an annular peripheral flange to which is secured as by means of rivets 23 a pair of sheet metal plates 24—24 which are preformed to afford a V-groove pulley and a projecting plate to which are welded in circumferentially spaced relation a number of fan blades 25 whose operation provides for the flow of ventilating air through the generator 15.

The construction described is employed with both engines and the fan belt pulleys afforded by the sets of plates 24—24 have fitted thereto a driving belt 26 which transmits the drive between the generators to maintain their operation in unison at the same speed regardless of relative speeds of the two engines. If the drive to the overrunning clutches in the two driving connections is equal in speed of rotation then both generators are driven by both engines but otherwise both generators are driven at the same speed from the faster operating power source. Should one driving shaft overrun the other then the slower operating shaft will be uncoupled automatically from the generator drive by means of its associated overrunning clutch. Thus even though one engine is out of operation both generators will be driven to supply electrical energy for whatever electrically operated apparatus is installed on the vehicle.

For enabling adjustment of belt tension the driving belt pulleys should be adjustable toward and away from one another and for this purpose each generator is pivotally suspended from the top wall of the deck 1 by means of pivot pins 27 joining the brackets 28 and 29 which are connected respectively to the deck 1 and generator 15. In addition a bracket 30 is secured on the underside of the generator 15 and has a projecting ear for connection by a clamping bolt 31 with a brace arm 32 pivotally anchored at 33 on the side wall of the hull 1. As seen in Figure 2 the end of the brace arm 32 is provided with an elongated slot in which the bolt 31 is slidable for making the necessary adjustment of the two generators relative to one another. Because of the necessity for belt adjustment the driving and driven shafts between the engine and generator are likely to be axially displaced but the slight misalignment is amply taken care of by reason of the universally jointed and slidably splined propeller shaft sections 10 and 11.

I claim:

1. In combination, a pair of driving shafts having bearings in fixed spaced relation, a pair of driven elements arranged substantially coaxially of the driving shafts, a drive belt coupling said driven elements for balanced operation, means for adjusting said driven elements toward and away from one another to set belt tension, and a pair of drive shafts connecting the coaxially related driving shafts and driven elements and having therein universal joints and sliding spline connections to accommodate belt adjustment positions of the driven elements.

2. In combination, a plurality of power delivery rotors arranged on substantially parallel transversely spaced axes, a plurality of transversely spaced driven units one for each rotor in substantial axial alignment therewith to be driven thereby, a belt drive interconnecting said units for their conjoint operation at the same speed, means adjustably mounting said units for relative transverse adjustment toward and from one another for setting belt tension, and drive transmitting means connecting the driven units to the rotors, respectively, and each including a slip joint and a universal joint to accommodate position adjustment of the units relative to each other and also including a one-way drive clutch.

3. In combination, a pair of transversely spaced generators for electrical connection in the same electrical circuit, a belt drive interconnecting the transversely spaced generators, adjustable generator mounting means for setting belt tension, separate drivers one for each generator arranged substantially coaxially therewith, a propeller shaft connecting each driver to its associated generator and including universal and slip joints to accommodate relative generator adjustment and displacement from said coaxial relation and an overrunning clutch between each generator and its driver to enable the belt drive to function in synchronizing generator operation from either driver.

4. In combination, a plurality of generators for electrical connection in the same electrical system, a belt drive between said generators to synchronize their speed of operation for substantial equalization of electrical output of the several generators, means mounting said generators to enable their relative adjustment toward and away from one another for regulating drive belt tension, a plurality of separate drive sources arranged to be coupled normally for conjoint operation at the same speed, drive transmitting means between the individual drive sources and certain of the generators and each drive transmitting means including an overrunning clutch and at least one of said drive transmitting means being constructed to accommodate axial misalignment between its drive source output shaft and the generator input shaft incident to relative belt tensioning adjustment of the generators and for that purpose comprising a drive shaft embodying both universal and slip joints.

EARLE S. MacPHERSON.